Figure 5:
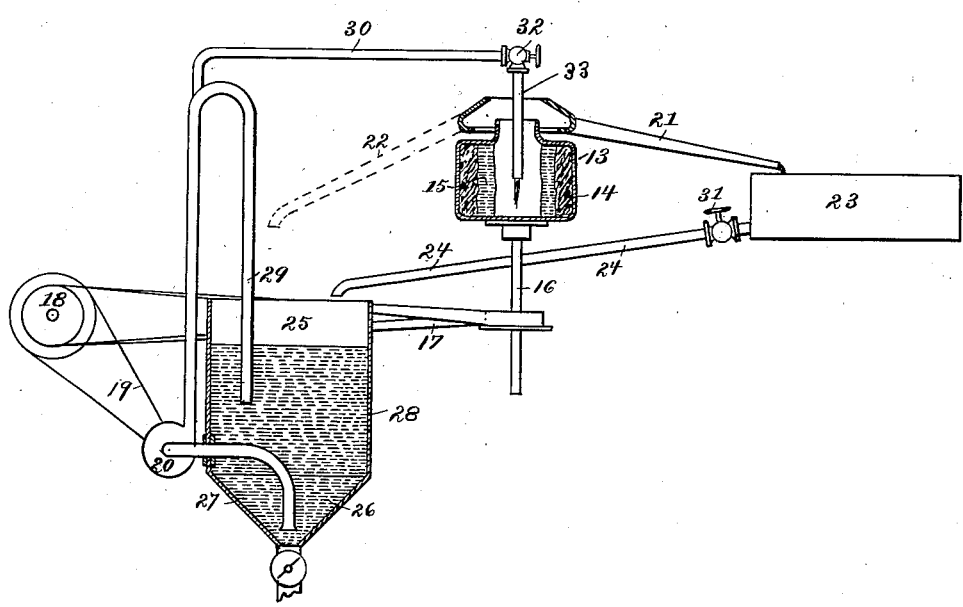

No. 863,062. PATENTED AUG. 13, 1907.
T. GRISWOLD, Jr.
METHOD OF WASHING.
APPLICATION FILED APR. 4, 1907.
4 SHEETS—SHEET 1.
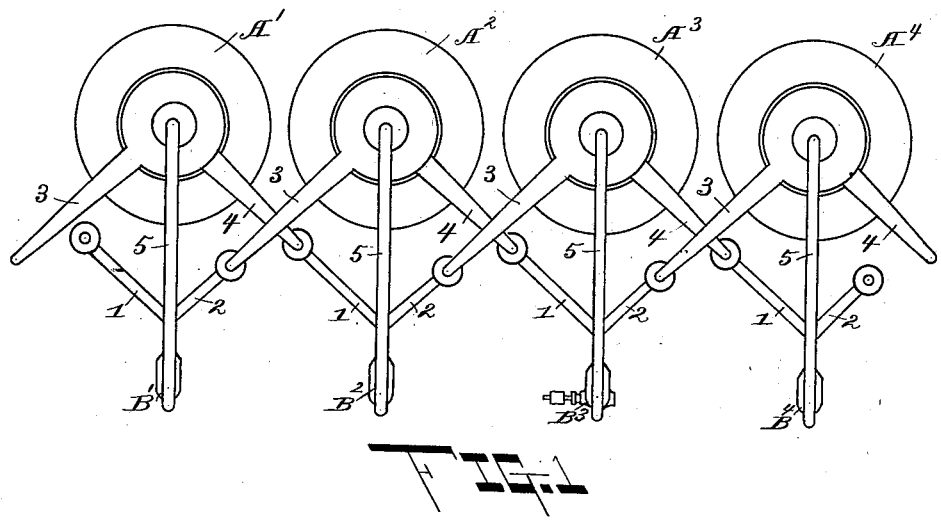
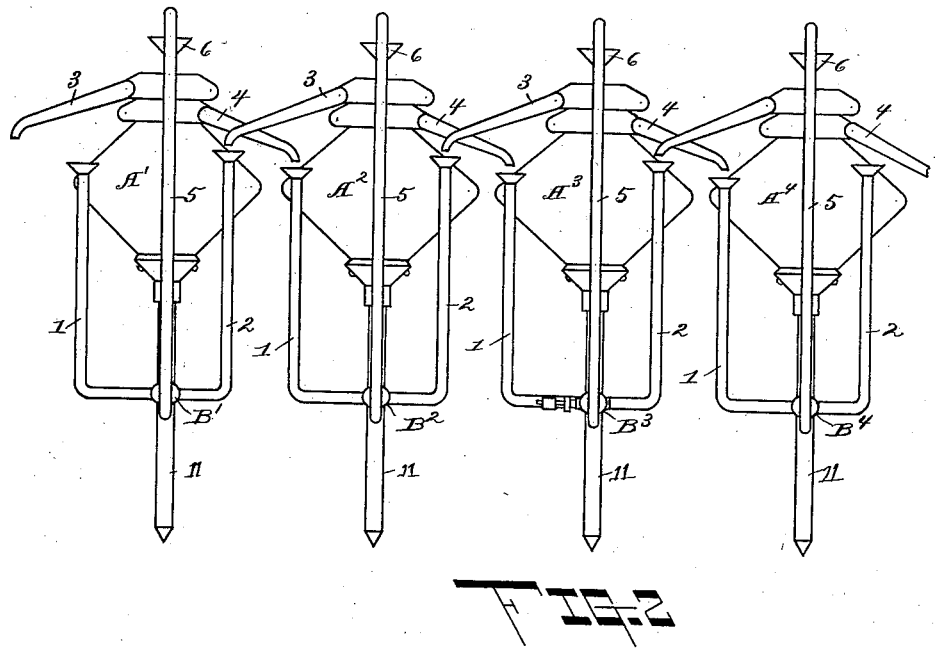
WITNESSES:
J. Ray Abbey
M. Israel
INVENTOR
Thomas Griswold, Jr.
BY J. B. Fay
ATTORNEY No. 863,062. PATENTED AUG. 13, 1907.
T. GRISWOLD, Jr.
METHOD OF WASHING.
APPLICATION FILED APR. 4, 1907.
4 SHEETS—SHEET 2.
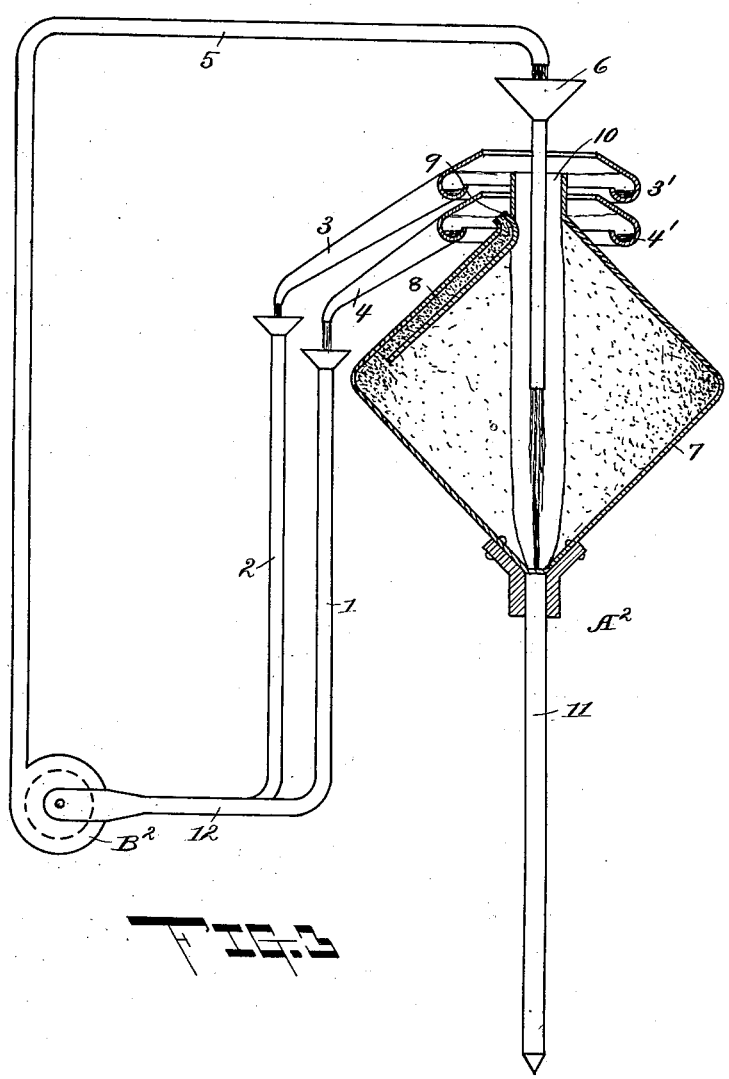
WITNESSES:
J. Ray Abbey
M. Israel
INVENTOR
Thomas Griswold, Jr.
BY
J. B. Fay
ATTORNEY

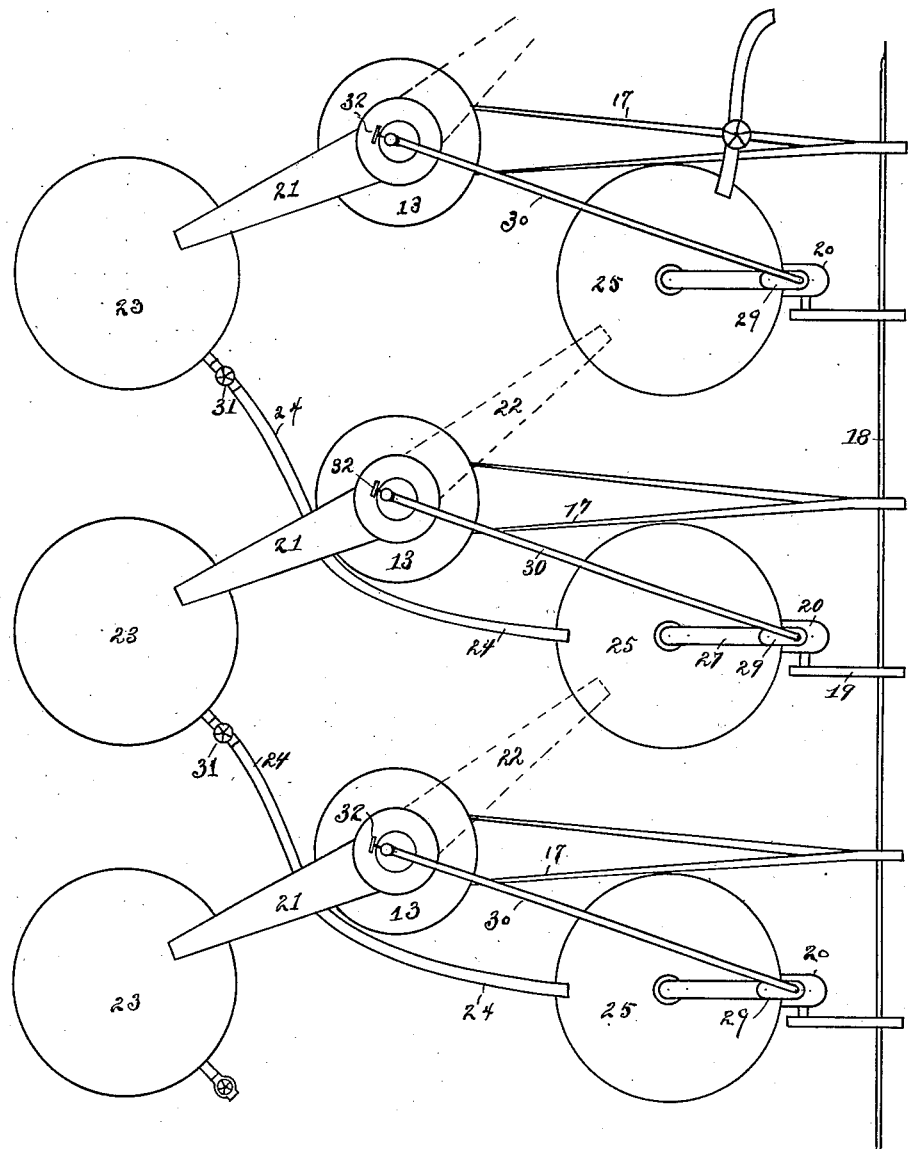

No. 863,062.

PATENTED AUG. 13, 1907.

T. GRISWOLD, Jr.
METHOD OF WASHING.
APPLICATION FILED APR. 4, 1907.

4 SHEETS—SHEET 4.

WITNESSES:
M. Israel
Jno. T. Oberlin

INVENTOR:
Thomas Griswold, Jr.
BY
J. B. Fay
ATTORNEY.

UNITED STATES PATENT OFFICE.

THOMAS GRISWOLD, JR., OF MIDLAND, MICHIGAN, ASSIGNOR OF ONE-HALF TO EDWIN O. BARSTOW, OF MIDLAND, MICHIGAN.

METHOD OF WASHING.

No. 863,062.  Specification of Letters Patent.  Patented Aug. 13, 1907.

Application filed April 4, 1907. Serial No. 366,854.

*To all whom it may concern:*

Be it known that I, THOMAS GRISWOLD, Jr., a citizen of the United States, a resident of Midland, county of Midland, and State of Michigan, have invented a new and useful Improvement in Methods of Washing, of which the following is a specification, the principle of the invention being herein explained and the best mode in which I have contemplated applying that principle, so as to distinguish it from other inventions.
My invention relates to the art of separating suspended matter from the liquid in which it is suspended and washing the material so separated.

It is more particularly adapted to the treatment of flocculent precipitates, slimes, pulps, muds, sediments and the like, the treatment of which constitutes an important feature of many industrial processes.

It is also adapted to the washing of impurities and mother liquors out of crude products, the extraction of metals or the salts of metals from their ores, the extraction of sugars, extracts, colors, dyes, and the like.

The object of such washing is usually to dissolve or take up, by means of a fluid solvent or wash, the soluble matter or "values" contained in the matter being treated, and to thereby separate those soluble "values" from the less soluble material or insoluble material, sediment, or sludge and from the insoluble matter that remains therein.

By the term "values" is meant the substances to be recovered or, in some processes the impurities to be eliminated. These "values" may be capable of solution in a solvent, and in that case, the separation would be based upon that solubility; or, the "values" may be capable of separation from the other constituents of the material being treated by reason of their capacity to remain mechanically suspended for some time in a fluid medium, similarly to the separation of slimes in ordinary water-gigs.

It will be seen from the further description of my invention that the capacity of any single constituent or several constituents to remain mechanically suspended for some time in a fluid medium is equivalent, insofar as the separation from the other constituents is concerned, to that constituent entering into solution.

As an example of the washing process referred to, take a case in which it is desired to remove iron from an aqueous solution in which it exists as a soluble salt in conjunction with soluble salts of other metals incapable of precipitation by the reagent which is used to precipitate the iron, such a salt, being for example, sodium chlorid. The iron may be precipitated by the addition of a proper proportion of an alkaline carbonate or hydrate, and, after agitation and settling, the flocculent iron precipitate will subside as a pulp or sludge and the clear solution of a part of the unprecipitated metals will remain over it. This separation, although quite distinct, is a very slow one, is more dependent upon the area of the separating chamber than upon its depth, and the pulp cannot be settled to a concentrated form in any reasonable length of time, nor in any reasonable amount of apparatus. The pulp, moreover, contains a low percentage of iron and also contains a correspondingly high percentage of water. The "values" remaining in solution in the pulp may be reduced by dilution with more water, agitation and resettling. Repeated washings, settlings and decantations will ultimately extract practically all the soluble "values" in the pulp, but in very much diluted solution, and at the expense of much solvent, although weak wash water may be systematically increased in strength, as ordinarily practiced, by being used with pulps of a progressively increasing percentage of "values". The treatment of large quantities of materials by the above method requires the use of many large chambers provided with stirring devices and power to drive them, and the tying up of a large money investment in material in process, and consequently, this progressive treatment cannot be utilized to the fullest extent because of a commercially prohibitive complication of apparatus and supervision. Some pulps are easily treated by filtration, leaching, settlement and decantation, or other processes. Some are of a colloidal nature and filtration will not readily remove the colloids. Others will clog a filter so soon that filtration is impracticable.

My invention is especially adapted to treat rapidly and efficiently those slimes or pulps which, having a slow rate of settling, make separation by settlement and decantation, as ordinarily practiced, very slow, and which are not adapted to economical treatment by filtration or leaching.

The invention aims to accomplish the separations above outlined, or, by suitable adaptation, to accomplish such separations as are required in other industries, as, for instance, the recovery of cyanid of gold from slimes.

The object of my present invention is to wash the pulp and to then remove and wash the resulting sludge, these washing and separating operations being automatically repeated any desired number of times; and, further, to accomplish these results in a rapid, economical and efficient manner.

Further objects are to reduce the investment in apparatus and machinery, to remove the "values" in pulps, slimes, etc., to as full an extent as may be desired, to reduce to a low sum the investment tied up in the materials in process, and to extract the soluble matter in as concentrated a form as possible, thereby reducing the quantity of solvent or wash water required, and the tankage necessary to hold the extracted "values." This latter improvement, viz., that of extracting the "values" in as concentrated a form as possible and thereby reducing the tankage, will be found to be a very important part in my invention.

In this invention, in effect, a solvent or washing fluid is caused to traverse in one direction through a series of dissolving or washing operations and pulp or sludge is simultaneously caused to traverse in the opposite direction through the same series. The sludge is thereby repeatedly washed, separated and rewashed in solvent of progressively increasing solvent power and carrying a decreasing burden of "values" until, when discharged at the end of such series of steps the sludge is practically deprived of soluble "values." The arrangement is such that the solvent entering the series fresh is used to wash sludge that has been deprived of nearly all its soluble "values." Such partly charged solvent is thereafter used in the subsequent steps of the series to successively wash the charges of sludge, each of which charges is somewhat stronger in soluble "values" than the previous one. The effect on the fresh solvent is to successively add to it quantities of soluble "values" until, when the solvent leaves the series, it is highly charged with these "values."

The annexed drawings and the following description set forth in detail one mode of carrying out the invention, such disclosed mode, however, constituting but one of various ways in which the principle of the invention may be used.

In the accompanying drawings, Figure 1 is a top plan view of a system embodying a portion of my invention and designed to separate the material fed thereto in accordance with my process. Fig. 2 is a side view thereof. Fig. 3 is a part sectional view of a separator illustrating diagrammatically the flow of liquids from two separators, their mixing and subsequent discharge into a third separator. Fig. 4 represents a top plan view of a system in which a modification of my process is adapted to be carried out. Fig. 5 is a part sectional view of one of the units in said modified system, looking in the direction indicated by the arrow in Fig. 4.

The apparatus thus chosen for illustrative purposes consists of a series of centrifugal separating devices adapted to separate by centrifugal force the heavier suspended material from the fluid in which it is suspended, and provided with independent delivery pipes for the two constituents so separated. Directly related to each separator is a centrifugal pump which is adapted to mix together unlike constituents separated in different separators and to discharge the mixture into a third separator. In the following description, the centrifugal separators will be referred to as "separators" and the centrifugal mixing pumps will be referred to as "mixers."

The pulp or other material to be treated is admitted to the first mixer of the series where solvent that contains a large per cent. of soluble "values" is added to it. The mixture of pulp and solvent thus formed is separated in the first separator of the series, the effect of separation being to divide the mixture into a sludge weaker in soluble "values" than the original pulp, and a solvent more heavily charged with soluble values than before. The heavily charged solvent is discharged from the apparatus and then the sludge that remains is passed to the next mixer, where it is again mixed with solvent weaker in soluble "values" than the solvent employed in the first mixer. The resultant mixture is again settled in the next separator of the series and is by so separating once more divided into a still weaker sludge and a more heavily charged solvent. The process continues through the whole series of receptacles until the resultant sludge deprived of practically all of its soluble "values" is discharged at the end of the series.

Referring more particularly to Figs. 1, 2 and 3, $B^1$, $B^2$, $B^3$ and $B^4$ indicate pumps, and $A^1$, $A^2$, $A^3$ and $A^4$ indicate centrifugal separators. The construction of a centrifugal separator is well known and many different forms have been developed. Hence, it is not my intention to enter into a minute explanation of the details of such device, the form shown being one of a number capable for use for carrying out my invention, and modification of details calculated to increase the efficiency may be resorted to without departing from the spirit and scope of my invention. As the individual members of the system are alike, a description of one will suffice for all.

The centrifugal pump $B^2$ is provided with a suction pipe (12). Branches 2 and 1 of the suction pipe are adapted respectively to receive material from the upper discharge spout (3) and the lower discharge spout (4) of two other and adjacent separators, as hereinafter set forth. The office of the suction pipe (12) is to receive dissimilar materials discharged from two separators and lead them to the pump $B^2$ of a third separator, where they are thoroughly mixed and thence discharged in to the third separator by way of pipe (5).

The separator $A^2$ comprises a vessel (7) mounted upon a vertical spindle (11) rotated in any suitable manner. The upper end of the vessel is provided with an open neck (10) down through which depends a funnel pipe (6) into the upper end of which the discharge pipe (5) discharges its contents. Encircling the neck and superposed one above the other are a pair of hollow collars, (3'), (4'), the collar (3') being located at about the level of the upper end of the neck to receive the lighter material discharged from the separator, such collar being equipped with a spout (3) adapted to lead the lighter constituent to and deposit it in the open mouth of the branch (2) of the Y-shaped pipe leading to the pump $B^1$ discharging into the adjoining separator $A^1$. Arranged along one upper wall of the separator and extending from a point near the greatest diameter of the separator to the base of the neck through which it protrudes, is a tube (8) adapted to convey the heavier particles of material from the separator and discharge them into the collar (4') which latter is provided with a spout (4) leading to the branch (1) of the suction pipe feeding pump $B^3$. The outer arm (1) of the suction pipe leading to pump $B^1$ is adapted to receive the mixture to be treated and the arm (2) of the suction pipe feeding pump $B^4$ may receive the wash water or solvent. The spout (4) leading from the separator $A^4$ discharges the washed pulp or other mixture and the spout (3) leading from the separator $A^1$ discharges the enriched solvent or wash water. Thus it will be seen that the lighter constituent is fed in at the same end of the system from which the heavier material is discharged and vice versa, the heavier mixture is fed in at the opposite end of the system and at which opposite end the lighter constituent is discharged.

The operation of the device is as follows: Supposing the wash water or solvent be fed into the arm or branch (2) of pump $B^4$ and the mixture to be treated be fed into the arm or branch (1) of pump $B^1$, the constituents, having been given time to travel through the system in opposite conflicting directions, it will be seen that the lighter constituent, after passing through separators $A^4$, $A^3$ and $A^2$ will be discharged into pipe (2) of the pump $B^1$ which will convey it to the pump, the mixture to be treated having already arrived in the pump through the pipe (1). The pump will thoroughly commingle the light and heavy constituents discharging them into the separator $A^1$ through pipe (5). The rapidly rotating vessel (7) causes the separation of the light and heavy particles of matter, the lighter particles being discharged through the spout (3) while the heavy particles are conveyed by way of spout (4) of the branch (1) of the suction pipe leading to pump $B^2$. Here again the heavier material is mixed with a fresh supply of wash water, solvent or other like constituent coming from separator $A^3$ by way of spout (3) and branch (2), and is subsequently discharged into separator $A^2$ wherein the light and heavy particles are again separated, the lighter particles traveling toward pump $B^1$ while the heavy materials travel toward pump $B^3$. The same commingling and subsequent washing or separating process is again followed with regard to unit $A^3$, $B^3$ and yet again when the material reaches the unit $A^4$ $B^4$ from which the heavier material is discharged through spout (4). Hence, as the mixture under treatment progresses from the pump $B^1$ toward separator $A^4$ it is commingled with a successively fresh supply of solvent and the soluble matter separated from insoluble material. Each commingling and separation dissolves a little more of the soluble material which is carried backward by and in the solvent, until at last the insoluble material alone is discharged through the spout (4). On the other hand, the solvent as it travels from the pump $B^4$ toward the separator $A^1$ absorbs or picks up increasing amounts of the soluble material until as it issues from the spout (3) it is highly enriched.

This invention then consists in effecting a contrary flow of sludge and solvent through a series of mixing and centrifugal separating chambers and the consequent production of the solution concentrated in values. By increasing the number of mixing and separating units in the series, the percentage of soluble values remaining in the discharged sludge may be reduced indefinitely and the efficiency of extraction may be raised to a correspondingly high point.

The apparatus described above is particularly adapted to the treatment of materials which when subjected to the action of centrifugal force will be separated into more or less clarified liquid and thicker pulp having fluid properties. Certain modifications are necessary for the treatment of materials which under the influence of centrifugal force separate as a thick sediment or sludge having a pasty or rigid nature and not possessed of sufficient fluidity to automatically discharge from the type of separator shown in Figs. 1, 2 and 3. For such materials it is necessary to use other types of separators in which special provision is made for removing from the separator the heavy non-fluid separated material. Several such separators have been devised, particularly a separator provided with gated orifices on the periphery of the bowl. Furthermore, suitable modifications of the connecting pipes shown in the drawings herewith will permit the lighter fluid constituent from one separator to wash the discharged heavy constituent from another separator into the suction pipe of the mixing pump related to a third separator. In this connection and referring now particularly to Figs. 4 and 5, I shall describe a form of apparatus illustrating a part of my invention in which the liquid or lighter constituent is adapted to be discharged continuously from the separator; whereas the thick sediment or sludge is removed intermittently. In said form of apparatus a suitable separator (13) is revolved through the medium of a vertical spindle (16) and a belt (17) driven from the shaft (18), the mixture to be separated entering the separator (13) through the connection (30). The mixture is here separated into an outer ring (14) of heavy material and an inner ring (15) of liquid material. The liquid is discharged continuously from the separator by way of the spout (21) into the receiving tank (23), where it is retained temporarily. The solid material in the ring (14) is allowed to accumulate until its removal is necessary, when by means of the valve (32) the flow of material to the separator is stopped. The spout (21) is then revolved into the position (22), and while the separator is revolving a stream of water or other fluid is let into the separator bowl where it is mixed with the solid material therein and the mixture is discharged by the spout (22) into the mixing tank (25), which is provided with a centrifugal mixing pump (20) adapted to draw material from the bottom of the tank and to discharge it again into the tank by way of pipe (29) or to the separator by way of pipe (30).

The operation of the device is as follows—The material to be treated is run into the tank (25) in which tank it is mixed with wash water or solvent from tank (23) let in by way of pipe (24). The pump (20) draws the material and solvent from the bottom of the tank, pumping it over by way of the pipe (29), and maintaining a thorough mixture therein. Upon opening valve (32) a portion of the mixture discharged by the pump will pass into the separator where it will be separated, the fluid constituent passing by way of spout (21) to the tank (23) where it will be held by the valve (31) temporarily, awaiting subsequent mixture with another batch of material in another tank. After all of the mixture has been pumped from tank (25) and passed through separator (13) and the fluid constituent thereof stored in tank (23), the heavier material accumulated in the separator is removed and placed in another tank (25) wherein it is mixed with another batch of solvent previously separated in another separator and run in by means of pipe (24). The manner of removal of the accumulated material from the separator is immaterial. It may be removed by flushing out with a stream of solvent or wash water available for the purpose and discharged by way of the funnel (22.), or separator may be stopped and the material removed by mechanical means or by hand. The movement of the solvent and material throughout the system of separators, mixers and storage tanks shown in Fig. 4 is similar to the movement of the same materials as already described for Fig. 1, the only modification being that owing to the intermittent removal of the solid material from the separators, storage capacity is provided in the mixing device and between each separator and mixer. Otherwise, the description holds good.

I wish to distinctly point out that an exact construction of separating and mixing devices is immaterial to the principle of my invention, except insofar as the separator is adapted to divide the mixed fluid and suspended solid into two portions having relatively different proportions of solid and liquid, and is furthermore provided with means for continuously receiving the mixture, and for discharging the separated constituents, and that the mixing device be adapted to receive the separated unlike constituents from two independent separators and to thoroughly mix the same, the method of pumping or delivering the mixed constituents to the separators being immaterial.

Other modes of applying the principle of my invention may be employed instead of the one explained, change being made as regards the process herein disclosed, provided the step or steps stated by any one of the following claims or the equivalents of such stated step or steps be employed.

I therefore particularly point out and distinctly claim as my invention:—

1. The method of separating the more soluble constituents of a material from the less soluble constituents thereof, which consists in causing currents of the material and a fluid solvent whose general directions of flow are opposite to encounter each other intermittently.

2. The method of separating the more soluble constituents of a material from the less soluble constituents thereof, which consists in causing currents of the material and a fluid solvent, whose general directions of flow are opposite, to flow jointly through the several members of a series of mixing devices, and, after thus mixing the currents, separating the same again.

3. The method of separating the more soluble constituents of a material from the less soluble constituents thereof, which consists in maintaining currents of said material and a solvent, respectively, flowing in general opposite directions; at intervals temporarily joining said currents; mixing them together; and then separating the undissolved material from the solvent.

4. The method of separating the more soluble constituents of a material from the less soluble constituents thereof, which consists in maintaining currents of said material and a solvent, respectively, flowing in general opposite directions; at intervals changing the flow of one of said currents to join temporarily with the other current; mixing such joint current, and then separating the same again into its constituents.

5. The method of separating the more soluble constituents of a material from the less soluble constituents thereof, which consists in simultaneously passing a fluid solvent and the material in general opposite directions through a series of mixing and separating chambers, causing said solvent and material to flow in a joint current through said mixing chambers and in counter currents through said separating chambers.

6. In a method of separating the more soluble constituents of a material from the less soluble constituents thereof, the steps which consist in agitating such material with a solvent; separating out the undissolved material; and, then repeating the cycle, successive mixtures being separated in successive separating chambers of a series, the solvent being simultaneously caused to flow in the same direction as said material in the successive agitating steps and in the opposite direction thereto in the separating steps.

7. In a method of separating the more soluble constituents of a material from the less soluble constituents thereof, the steps which consist, in pumping the material in one of a series of chambers; agitating the same in a second chamber; separating it in a third chamber; and, then, repeating the cycle, the second agitation and separation being accomplished in other chambers of said series, the solvent being simultaneously passed through said agitating chambers in the same direction and in said separating chambers in the opposite direction as said material.

8. In a method of separating the more soluble constituents of a material from the less soluble constituents thereof, the steps which consist in causing a fluid solvent to traverse a series of alternate mixing and separating chambers and simultaneously causing the material to traverse said chambers in a counter direction, the two currents being alternately joined in said mixing chambers and separated in said separating chambers so that a fluid solvent whose percentage of dissolved values is increasing encounters material whose successive portions contain increasing percentages of soluble constituents.

9. In a method of separating the more soluble constituents of a material from the less soluble constituents thereof, the steps which consist in alternately mixing together and separating a fluid solvent and the solid material, said solvent and material being caused to flow in a joint current in said mixing steps and in counter currents in said separating steps.

10. In a method of separating the more soluble constituents of a material from the less soluble constituents thereof, the steps which consist in causing a fluid solvent to traverse a series of alternate mixing and separating devices and simultaneously causing the material to traverse said mixing devices in a joint current and said separating chambers in counter currents, whereby the two currents are alternately mixed together and separated so that a fluid solvent whose percentage of dissolved values is increasing encounters material whose successive portions contain increasing percentages of soluble constituents.

11. The method of separating the more soluble constituents of a material from the less soluble constituents thereof, which consists in independently mixing two quantities of such material with a solvent, separating such two mixtures, mixing two of the unlike constituents thus separated, and re-separating such last mixtures.

12. The method of separating the more soluble constituents of a material from the less soluble constituents thereof, which consists in independently mixing two quantities of such material retaining different proportions of soluble values with two quantities of solvent unequally charged with such values, separating such two mixtures, mixing two of the unlike constituents thus separated, and re-separating such last mixture.

13. The method of separating the more soluble constituents of a material from the less soluble constituents thereof, which consists in independently mixing two quantities of such material retaining different proportions of soluble values with two quantities of solvent correspondingly unequally charged with such values, separating such two mixtures, mixing two of the unlike constituents thus separated, and re-separating such last mixture.

14. The method of separating the more soluble constituents of a material from the less soluble constituents thereof, which consists in mixing a quantity of such material with a quantity of solvent, independently mixing a second quantity of material with a second quantity of solvent both containing a smaller proportion of soluble values than said first quantities, separating such two mixtures, mixing the material remaining from such first mixture with the clarified solvent from such second mixture, and re-separating such last mixture.

15. The method of separating the more soluble constituents of a material from the less soluble constituents thereof, which consists in continuously separating into their constituents in two separate chambers currents of the material mixed with a solvent, drawing off from said chambers currents of undissolved material and clarified solvent, mixing currents of unlike constituents from said two chambers, and continuously separating such last mixture in a third chamber.

16. The method of separating the more soluble constituents of a material from the less soluble constituents thereof, which consists in continuously separating into their constituents in two separate chambers currents made up of quantities of such material retaining different proportions of values mixed with quantities of solvent charged with different proportions of such values, drawing off from said chambers currents of undissolved material and clarified solvent, mixing currents of unlike constituents from said two chambers, and continuously separating such mixture in a third chamber.

17. The method of separating the more soluble constituents of a material from the less soluble constituents thereof, which consists in continuously separating in one chamber a current made up of a quantity of such material mixed with a quantity of solvent, similarly separating in another chamber another current made up of a quantity of material mixed with a quantity of solvent, both of said second quantities containing a smaller proportion of soluble values than said first quantities, drawing off from said two chambers currents of undissolved material and clarified solvent, mixing the current of material from said first chamber with the clarified solvent from said second chamber, and continuously separating such last mixture in a third chamber.

18. The method of separating the more soluble constituents of a material from the less soluble constituents thereof, which consists in continuously mixing, at consecutive stations in its course, a current of such material with a current of solvent, flowing in a general opposite direction, and thereupon separating the resultant mixtures, the undissolved material remaining from any one station being mixed with the clarified solvent from a station twice removed therefrom.

19. The method of separating the more soluble constituents of a material from the less soluble constituents thereof, which consists in causing currents of the material and a solvent to flow through a series of connected chambers in counter-directions wherein the said material and solvent are alternately mixed together and separated, the constituents of a mixture separated in any one chamber being previously separated respectively in the two chambers situated serially on either side of such first-named chamber.

20. The method of separating the more soluble constituents of a material from the less soluble constituents thereof, which consists in causing currents of the material and a solvent to flow through a series of connected chambers in counter-directions wherein the said material and solvent are alternately mixed together and separated, the constituents of a mixture separated in any one chamber being previously separated as unlike constituents respectively in the two chambers situated serially on either side of said first-named chamber.

21. The method of separating the more soluble constituents of a material from the less soluble constituents thereof, which consists in continuously separating mixtures of the material and a solvent in a series of separating chambers, the mixture separated in any chamber except the first and last in the series consisting of the material and solvent previously separated respectively in the two separating chambers located serially on either side of said first-named chamber.

22. The method of separating the more soluble constituents of a material from the less soluble constituents thereof, which consists in continuously mixing the material and a solvent in a series of mixing chambers and separating the mixtures in separating chambers directly related serially thereto, the two constituents mixed in any mixing chamber except the first and last of the series being separated previously as unlike constituents respectively in separating chambers directly related respectively to mixing chambers situated serially on either side of the said mixing chambers.

23. The method of separating the more soluble constituents of a material from the less soluble constituents thereof, which consists in continuously feeding the material and a fluid solvent into opposite ends of a series of mixing chambers, each mixing chamber being directly related to one of a second series of separating chambers; continuously mixing currents of the material and solvent in the mixing chambers and separating the resulting mixture in the respectively related separating chambers, the material and solvent separated in a separating chamber being previously separated as unlike constituents in the two separating chambers located serially on either side of the said chamber.

24. The method of separating the more soluble constituents of a material from the less soluble constituents thereof, which consists in passing a continuous current of the material into the first one of a series of compound chambers, and a continuous current of a solvent into the last one of the same series, each compound chamber consisting of a mixing chamber connected with a separating chamber; mixing and separating untreated material and nearly spent solvent in the first compound chamber, mixing and separating nearly treated material and fresh solvent in the last compound chamber; mixing and re-separating in any other compound chamber the unlike portions of material and solvent respectively which have been separated just previously in the compound chambers located serially on either side of said compound chamber; drawing off continuously from the last of the series treated material; and from the first of the series spent solvent.

25. The method of separating the more soluble constituents of a material from the less soluble constituents thereof, which consists in maintaining currents of said material and a solvent, respectively, flowing in general opposite directions; at intervals temporarily joining said currents; mixing them together; and then centrifugally separating the undissolved material from the solvent.

26. The method of separating the more soluble constituents of a material from the less soluble constituents thereof, which consists in maintaining currents of said material and a solvent, respectively, flowing in general opposite directions; at intervals changing the flow of one of said currents to join temporarily with the other current; mixing such joint current, and then centrifugally separating the same again into its constituents.

27. The method of separating the more soluble constituents of a material from the less soluble constituents thereof, which consists in simultaneously passing a fluid solvent and the material in general opposite directions through a series of mixing and centrifugal separating devices.

28. The method of separating the more soluble constituents of a material from the less soluble constituents thereof, which consists in simultaneously passing a fluid solvent and the material in general opposite directions through a series of alternate mixing and centrifugal separating devices.

29. In a method of separating the more soluble constituents of a material from the less soluble constituents thereof, the steps which consist in agitating such material with a solvent; centrifugally separating out the undissolved material; and then repeating the cycle, successive mixtures being separated in successive separating chambers of a series, the solvent being simultaneously caused to flow in the same direction as said material in the successive agitating steps and in the opposite direction thereto in the separating steps.

30. In a method of separating the more soluble constituents of a material from the less soluble constituents thereof, the steps which consist, in pumping the material; agitating the same; separating it; and, then repeating the cycle, said material being separated in successive chambers of a series, the solvent being continuously and simultaneously caused to flow in the same direction as said material in the successive agitating steps and being centrifugally separated from the same in separating steps.

31. In a method of separating the more soluble constituents of a material from the less soluble constituents thereof, the steps which consist, in pumping the material in one of a series of chambers; agitating the same in a second chamber; centrifugally separating it in a third chamber, and, then repeating the cycle, the second agitation and separation being accomplished in other chambers of said series, the solvent being simultaneously passed through said agitating chambers in the same direction and in said separating chambers in the opposite direction as said material.

32. In a method of separating the more soluble constituents of a material from the less soluble constituents thereof, the steps which consist, in pumping the material in one of a series of chambers; agitating the same in one of a second series of chambers; centrifugally separating it in another chamber of said first series; and, then, repeating the cycle, said material being separated in successive chambers of said first series, the solvent being simultaneously caused to flow through said agitating chambers in the same direction as said material and caused to flow in the opposite direction thereto in said separating chambers.

33. In a method of separating the more soluble constituents of a material from the less soluble constituents thereof, the steps which consist in alternately mixing together and centrifugally separating a fluid solvent and the material, said solvent and material being caused to flow in a joint current in successive mixing steps and in counter currents in successive separating steps.

34. In a method of separating the more soluble constituents of a material from the less soluble constituents thereof, the steps which consist in alternately mixing together and centrifugally separating a fluid solvent and the solid material, said solvent and material being caused to flow in a joint current in said mixing steps and in counter currents in said separating steps.

35. The method of separating the more soluble constituents of a material from the less soluble constituents thereof, which consists in independently mixing two quantities of such material with a solvent, centrifugally separating such two mixtures, mixing two of the unlike constituents thus separated, and re-separating such last mixture as before.

36. The method of separating the more soluble constituents of a material from the less soluble constituents thereof, which consists in independently mixing two quantities of such material retaining different proportions of soluble values with two quantities of solvent unequally charged with such values, centrifugally separating such two mixtures, mixing two of the unlike constituents thus separated, and re-separating such last mixture as before.

37. The method of separating the more soluble constituents of a material from the less soluble constituents thereof, which consists in independently mixing two quantities of such material retaining different proportions of soluble values with two quantities of solvent correspondingly unequally charged with such values, centrifugally separating such two mixtures, mixing two of the unlike constituents thus separated, and re-separating such last mixture as before.

38. The method of separating the more soluble constituents of a material from the less soluble constituents thereof, which consists in mixing a quantity of such material with a quantity of solvent, independently mixing a second quantity of material with a second quantity of solvent, both containing a smaller proportion of soluble values than said first quantities, centrifugally separating such two mixtures, mixing the material remaining from such first mixture with the clarified solvent from such second mixture, and re-separating such last mixture as before.

39. The method of separating the more soluble constituents of a material from the less soluble constituents thereof, which consists in centrifugally separating into their constituents in two separate chambers currents of the material mixed with a solvent, drawing off from said chambers currents of undissolved material and clarified solvent, mixing currents of unlike constituents from said two chambers, and centrifugally separating such last mixture in a third chamber.

40. The method of separating the more soluble constituents of a material from the less soluble constituents thereof, which consists in centrifugally separating into their constituents in two separate chambers currents made up of quantities of such material retaining different proportions of values mixed with quantities of solvent charged with different proportions of such values, drawing off from said chambers currents of undissolved material and clarified solvent, mixing currents of unlike constituents from said two chambers, and centrifugally separating such mixture in a third chamber.

41. The method of separating the more soluble constituents of a material from the less soluble constituents thereof, which consists in centrifugally separating in one chamber a current made up of a quantity of such material mixed with a quantity of solvent, similarly separating in another chamber another current made up of a quantity of material mixed with a quantity of solvent, both of said second quantities containing a smaller proportion of soluble values than said first quantities, drawing off from said two chambers currents of undissolved material and clarified solvent, mixing the current of material from said first chamber with the clarified solvent from said second chamber, and centrifugally separating such last mixture in a third chamber.

42. The method of separating the more soluble constituents of a material from the less soluble constituents thereof, which consists in continuously mixing, at consecutive stations in its course, a current of such material with a current of solvent, flowing in a general opposite direction, and thereupon centrifugally separating the resultant mixtures, the undissolved material remaining from any one station being mixed with the clarified solvent from a station twice removed therefrom.

43. The method of separating the more soluble constituents of a material from the less soluble constituents thereof, which consists in causing currents of the material and a solvent to flow through a series of connected chambers in counter-directions wherein the said material and solvent are alternately mixed together and centrifugally separated, that the constituents of a mixture separated in any one chamber being previously separated respectively in the two chambers situated serially on either side of such first-named chamber.

44. The method of separating the more soluble constituents of a material from the less soluble constituents thereof, which consists in causing currents of the material and a solvent to flow through a series of connected chambers in counter-directions wherein the said material and solvent are alternately mixed together and centrifugally separated, the constituents of a mixture separated in any one chamber being previously separated as unlike constituents respectively in the two chambers situated serially on either side of said first-named chamber.

45. The method of separating the more soluble constituents of a material from the less soluble constituents thereof, which consists in centrifugally separating mixtures of the material and a solvent in a series of separating chambers, the mixture separated in any chamber except the first and last in the series consisting of the material and solvent previously separated respectively in the two separating chambers located serially on either side of said first-named chamber.

46. The method of separating the more soluble constituents of a material from the less soluble constituents thereof, which consists in continuously mixing the material and a solvent in a series of mixing chambers and centrifugally separating the mixtures in separating chambers directly related serially thereto, the two constituents mixed in any mixing chamber except the first and last of the series being separated previously as unlike constituents respectively in separating chambers directly related respectively to mixing chambers situated serially on either side of the said mixing chambers.

Signed by me, this 7th day of March, 1907.

THOMAS GRISWOLD, Jr.

Attested by—
J. E. Le Fevre,
Rupert E. Paris.